G. W. Bunker.
Corn Planter.
No. 91,904. Patented Jun. 29, 1869.

Witnesses:

Inventor:
G. W. Bunker
pr. Attorneys.

United States Patent Office.

GEORGE W. BUNKER, OF ST. ANTHONY, MINNESOTA, ASSIGNOR TO HIMSELF AND DAVID THAYER, OF BOSTON, MASSACHUSETTS.

Letters Patent No. 91,904, dated June 29, 1869.

IMPROVEMENT IN CORN-PLANTERS.

The Schedule referred to in these Letters Patent and making part of the same.

*To all whom it may concern:*

Be it known that I, GEORGE W. BUNKER, of St. Anthony, in the county of Hennepin, and State of Minnesota, have invented a new and useful Improvement in Corn-Planters; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to improve the construction of corn-planters, so as to make them more convenient and effective in operation, doing more and better work than the corn-planters constructed in the ordinary manner; and It consists in the construction and combination of various parts of the machine, as hereinafter more fully described.

A is the axle of the machine, upon the journals of which the wheels B revolve, and which itself revolves in bearings attached to the frame C.

Figure 1:
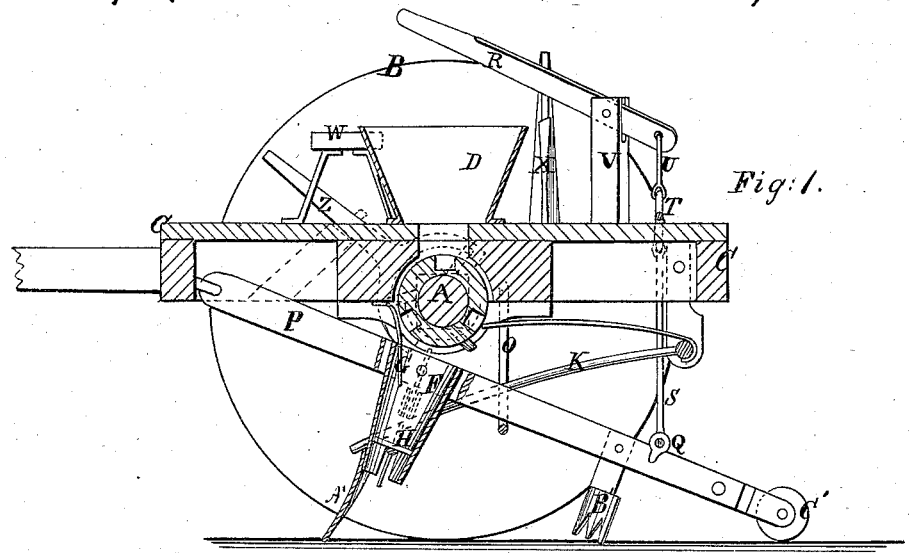
Figure 1 is a detail sectional view of my improved corn-planter, taken through the line $x\,x$, fig. 2.
Figure 2:
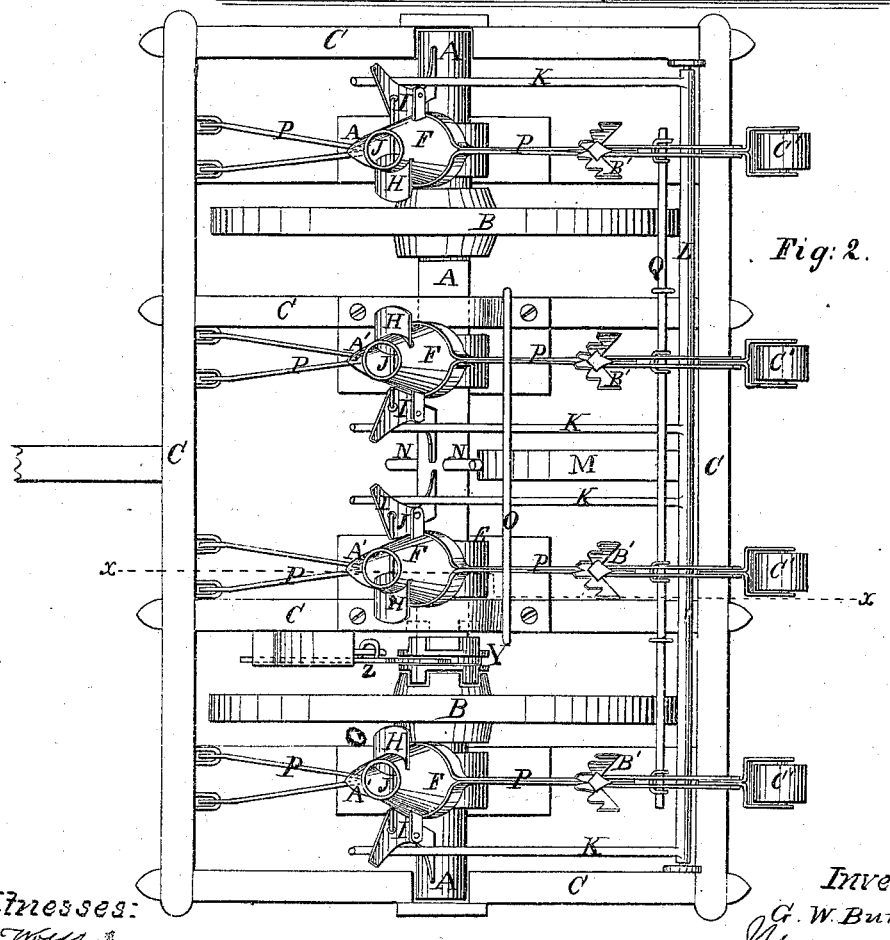
Figure 2 is an under-side view of the same.

The frame C extends beyond the wheels B, and to it are attached the hoppers or seed-boxes D, as shown in figs. 1 and 2, two of the seed-boxes being placed between the wheels B, and two outside of said wheels, one at each end of the frame C.

To the axle A are attached wheels or cylinders E, having recesses formed in their faces, of such a size as to contain enough seed for a hill.

As the axle A is revolved, the recessed cylinders E receive the seed from the seed-boxes $D_1$ and convey it to the spouts F, by which it is conducted to the ground.

G are guide-aprons, the upper ends of which are attached to the frame C, just in front of the upper side of the cylinders E, which pass around the forward sides of said cylinders, and the lower ends of which enter the upper ends of the spouts F, so that the said aprons may keep the seed from dropping out of the recesses in the cylinders E before reaching the upper ends of the spouts F.

As the seed drops into the spouts F, it falls and rests upon the plates H, which pass through and work in slots in the sides of the lower part of the spouts F, and which are withdrawn at the proper time to allow the seed to drop to the ground.

I are levers, which are pivoted, at or near their middle parts, to ears, or other supports, attached to or formed upon the sides of the spouts F, and the lower ends of which are connected with the sliding plates H by rods J, so that the said plates may be operated by operating the said levers.

The outer edges or sides of the levers I are concaved, or made semicircular in form, as shown in fig. 2, so that they may be operated by the vertical movement of the free ends of the levers or arms K, which rest in the concavities of the said levers I.

The other ends of the levers or arms K are rigidly attached to the shaft L, which works in bearings attached to the under side of the rear part of the frame C.

To the middle part of the shaft L is attached a broad arm, M, which extends forward beneath the frame C into such a position that its forward or free end may be struck and operated by the pins N, attached to and projecting radially from the middle part of the axle A, so that the plates H may be operated to drop the seed by the revolution of the axle A.

The arms or levers K are kept from dropping down too far by the loop O, the ends of the arms of which are attached to the frame A, and which passes beneath the two central arms K, as shown in figs. 1 and 2.

P are bars, the forward ends of which are pivoted to the front part of the frame C, and which are formed with rings or holes, in which are placed and secured the conductor-spouts F, so that the said spouts may be supported by the said bars P.

The rear parts of the bars P are connected and held in their proper relative positions by the rod Q, which is connected with the lever R by the connection-rods S, bar T, and rod U, so that the bars P, and, with them, the conductor-spouts F, may be raised and lowered, and held in any desired position by means of the lever R.

The lever R is pivoted to a support, V, attached to the frame C, in such a position that the said lever may be conveniently operated by the driver from his seat W.

X is a standard, attached to the frame C, and projecting upward at the side of the lever R, and which is provided with teeth or notches, upon which the lever R may be caught to hold the bars P suspended at any desired elevation.

Y is a double clutch, which is placed upon the axle A, between one of the wheels B and a bar or beam of the frame C, and which is so formed, that when moved in one direction, it may take hold of the wheel B, and cause the said wheel to carry the said axle with it in its revolution, and when moved in the other direction, it may take hold of the frame C, and hold the axle A stationary, allowing the wheel B to revolve freely upon said axle.

Z is a lever, the forked lower end of which rides in a groove in the clutch Y, as shown in figs. 1 and 2, and which is pivoted to the frame C, in such a position that it may be conveniently reached and operated by the driver from his seat.

To the lower end of each of the spouts F is attached, or upon it is formed a plow, A', to open the ground to receive the seed.

To the bars P, in the rear of the spouts F, are attached rakes B', by the action of which the soil is raked over the seed, and stones, clods, &c., removed, which might otherwise interfere with the proper growth of the plants.

To the rear end of each of the bars P is pivoted a roller, C', by which the soil is pressed down upon the seed and left even and smooth, at the same time distinctly marking the rows.

Having thus described my invention,

I claim as new, and desire to secure by Letters Patent—

1. The adjustable pivoted bars P, when provided with the conductor-spouts F, rakes B', and pivoted rollers C', all arranged as described, for the purpose specified.

2. The combination of the sliding plates H, levers I, constructed as described, arms K, rock-shaft L, broad arm M, and radial pins N, with each other, and with the conductor-spouts F, axle A, and frame C, substantially as herein shown and described, and for the purposes set forth.

3. The rakes B' and rollers C', when both are arranged upon the pivoted arms P, as herein described, for the purpose specified.

GEORGE W. BUNKER.

Witnesses:
A. M. McPHAIL, Jr.,
A. M. McPHAIL.